June 21, 1932.    H. S. HANSON    1,863,902
CLIP
Filed Aug. 7, 1930
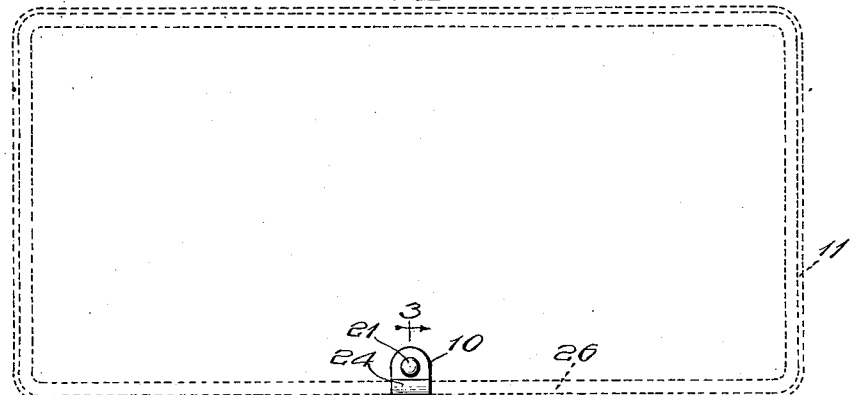
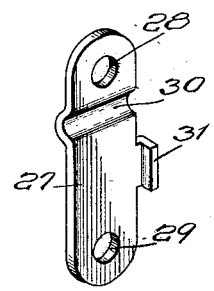
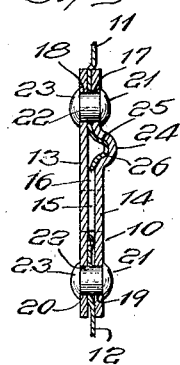
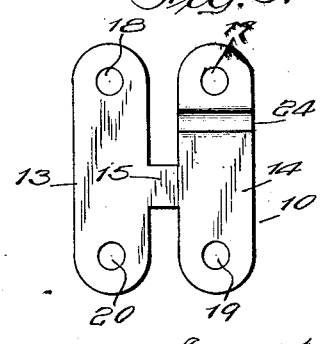
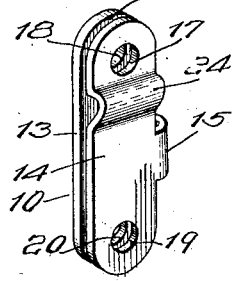
Inventor:
Henry S. Hanson Patented June 21, 1932

1,863,902

UNITED STATES PATENT OFFICE

HENRY S. HANSON, OF CHICAGO, ILLINOIS, ASSIGNOR TO THE C. H. HANSON COMPANY, OF CHICAGO, ILLINOIS, A CORPORATION OF ILLINOIS

CLIP

Application filed August 7, 1930. Serial No. 473,587.

The invention relates to clips and has as its prime object the production of a clip capable of holding a plurality of plates such as automobile license plates in rigid and inseparable association with each other.

It is an object of the invention to provide a clip capable of performing the above and other functions which may be readily stamped from sheet material and bent to form means for engaging an element of one of the plates to thereby assist in holding the clip and license plate against displacement.

It is an object of the invention to provide a construction having connected elements which are held in spaced relation to each other to provide for the reception of said plates between said elements, the plates being held in said space by means of fastening devices which are passed through apertures provided in the clip and forced through said plates, the fastening devices having an end thereof peened over to provide a head which cooperates with the material surrounding said apertures to prevent withdrawal of the fastening means from the plate and clip, the former of which is usually formed of some relatively thin gaged sheet material.

It is an object of the invention to provide a construction such as that referred to, having means for engaging a bead or an edge of the license plate to thereby prevent lateral displacement of the plate and the clip.

The invention has these and other objects all of which will be explained in detail and more readily understood when read in conjunction with the accompanying drawing which illustrates various embodiments of which the invention is susceptible, it being therefore, obvious that other arrangements may be resorted to without departing from the spirit of the appended claims forming a part hereof.

In the drawing:

Fig. 1 is a front elevation of the clip embodying the features of advantage above referred to and showing the clip associated with a plurality of license plates, the latter being shown in dotted lines;

Fig. 2 is a perspective view of the structure shown in Fig. 1;

Fig. 3 is a section taken on the line 3—3 of Fig. 1;

Fig. 4 is a section taken on the line 4—4 of Fig. 1;

Fig. 5 is a view of a blank which is bent to form the device illustrated in Figs. 1 to 4; and Fig. 6 is a modified structure which may be resorted to.

The clip is generally designated 10 and is designed to rigidly and inseparably hold license plates such as those illustrated and designated 11 and 12, in associated relation with each other.

The clip generally designated 10 is comprised of two elements 13 and 14 which are connected with each other through the medium of a connector 15 which is bent to arrange one of the elements such as 13 adjacent the other element 14 with a space 16 provided between said elements for the reception of license plates 11 and 12 which are inserted in said space.

The elements 13 and 14 are each provided with apertures designated 17, 18, 19 and 20, which are respectively provided adjacent the opposite ends of said elements 13 and 14 and are provided to respectively receive a fastening element such as that designated 21, which in the present instance is in the form of a rivet. These fastening devices have the usual head and shank 22, the latter of which is inserted in an aperture such as that designated 17 and then driven through the material forming the license plate and driven into and through the aperture such as 18. The one end of the fastening device is then peened over as indicated at 23 which securely holds the license plates between the two elements 13 and 14. It will be noted that the material of the elements 13 surrounding the apertures 18 and 20 forms in effect a washer which will resist withdrawal of the fastening device and thus prevent separation of the license plate and the clip. One of the elements such as 14 is provided with a portion 24 which is arranged transversely of the element 14 and in the present instance is constructed to provide a groove 25 into which the bead 26 of the license plate such as 11 is adapted to be arranged.

It is manifest that the structure including the groove 25 provides a means for cooperating with the bead 26 to thus hold the clip in proper relation to the plate such as 11. The structure illustrated in Fig. 6 contemplates the utilization of a single member 27 having apertures 28 and 29 located adjacent the opposite ends thereof, the latter of which are provided to receive a rivet or other fastening means for the purpose above referred to. This element 27 is also provided with a transversely arranged groove 30 which is employed to function in a manner similar to the groove 24. The element 27 is provided with an extension 31 which when the element 27 is associated with the plate such as 11 provides an abutment against which an edge of the plate 12 may engage to thus assist in holding the plate 12 in proper relation with the plate 11. From the foregoing description it is manifest that a simple construction is provided which may be stamped from a sheet of material and then bent in a manner to provide a space in which the license plates such as 11 and 12 may be inserted and held.

It is further manifest that the structure provides means which cooperates with the fastener to effectually resist any attempt to separate the clip and plate by tearing the material of the plate at the upset portion of the rivet and thus causing separation of the plate and clip.

Having thus described the invention what I claim and desire to cover by Letters Patent is:

1. A clip comprised of a pair of members and means integral with said members providing a connection between said members, said means providing means for maintaining said members in spaced relation to each other, one of said members having located between an end thereof and said means extending transversely thereof, the other member extending across the grooved portion, a grooved portion and both of said members having registering apertures provided adjacent the opposite ends thereof, providing means through which a fastener may be passed.

2. A clip comprised of a pair of members and means integral with said members providing a connection between said members, said means being arranged in spaced relation to the opposite ends of said members and providing means for maintaining said members in spaced relation to each other, one of said members having a groove arranged between said first mentioned means and one end of said member extending transversely thereof and both of said members having an aperture provided adjacent the opposite ends thereof, the apertures in one member being in register with the apertures provided in the other member, and providing means through which a fastener may be passed.

3. A clip comprised of elements each having an aperture provided at the opposite ends thereof, one of said elements having a transverse groove provided therein, a member extending between said elements arranged in spaced relation to the opposite ends of said elements and providing a connector connecting said elements, said connector being adapted to be bent to arrange one of said elements adjacent and in spaced relation to the other to thereby provide a space in which a plate may be arranged and held by the opposite ends of said clip.

4. A clip comprised of elements each having an aperture provided at the opposite ends thereof, a member extending from one element to the other transversely to said elements providing a connector connecting said elements, said connector being capable of being bent to arrange one of said elements in parallel relation to the other to thereby provide a space at the opposite ends of said elements in which a plate may be inserted and held by means of a member passed through said aperture.

In witness whereof, I hereunto subscribe my name this 1st day of August, A. D. 1930.

HENRY S. HANSON.

CERTIFICATE OF CORRECTION.

Patent No. 1,863,902.   June 21, 1932.

HENRY S. HANSON.

It is hereby certified that error appears in the printed specification of the above numbered patent requiring correction as follows: Page 2, line 43, claim 1, before the word "located" insert the words a grooved portion, and lines 46 and 47, same claim, strike out the words "a grooved portion"; and that the said Letters Patent should be read with these corrections therein that the same may conform to the record of the case in the Patent Office.

Signed and sealed this 4th day of October, A. D. 1932.

(Seal)

M. J. Moore,
Acting Commissioner of Patents.